United States Patent
Kwon et al.

(10) Patent No.: US 12,495,066 B2
(45) Date of Patent: Dec. 9, 2025

(54) MANAGED DETECTION AND RESPONSE SYSTEM AND METHOD BASED ON ENDPOINTS

(71) Applicant: PAGO NETWORKS, INC., Seoul (KR)

(72) Inventors: Young Mok Kwon, Hwaseong-si (KR); Chan Yeong Lee, Incheon (KR)

(73) Assignee: PAGO NETWORKS, INC., Seoul (KR)

( * ) Notice: Subject to any disclaimer, the term of this patent is extended or adjusted under 35 U.S.C. 154(b) by 314 days.

(21) Appl. No.: 17/778,877

(22) PCT Filed: Nov. 26, 2020

(86) PCT No.: PCT/KR2020/017010
§ 371 (c)(1),
(2) Date: May 23, 2022

(87) PCT Pub. No.: WO2021/112494
PCT Pub. Date: Jun. 10, 2021

(65) Prior Publication Data
US 2022/0417255 A1    Dec. 29, 2022

(30) Foreign Application Priority Data
Dec. 2, 2019 (KR) .......... 10-2019-0157971

(51) Int. Cl.
*H04L 9/40* (2022.01)
(52) U.S. Cl.
CPC ........ *H04L 63/145* (2013.01); *H04L 63/1416* (2013.01); *H04L 63/20* (2013.01)

(58) Field of Classification Search
CPC .... G06F 21/554; G06F 21/562; G06F 21/566; H04L 63/145; H04L 63/20; H04L 63/1416
See application file for complete search history.

(56) References Cited

U.S. PATENT DOCUMENTS 9,609,007 B1 * 3/2017 Rivlin ................. G06F 9/45508
10,225,280 B2 * 3/2019 Vu ........................ G06F 21/561
(Continued)

FOREIGN PATENT DOCUMENTS

EP           4254241 A1 * 10/2023 ............. G06F 21/55
KR   10-2012-0072266 A      7/2012
(Continued)

OTHER PUBLICATIONS

International Search Report for PCT/KR2020/017010 mailed Mar. 9, 2021 from Korean Intellectual Property Office.

*Primary Examiner* — Joseph G Ustaris
(74) *Attorney, Agent, or Firm* — Park, Kim & Suh, LLC (57) ABSTRACT

A managed detection and response system includes an enterprise network including a plurality of endpoints in which an endpoint agent is installed or not installed to detect and block malware through a machine learning algorithm and a plurality of network security solutions for applying a predetermined security policy to the plurality of endpoints, a threat analysis server configured to generate an IOC by analyzing the detected and blocked malware in any one of the plurality of endpoints and establish the security policy according to the generated IOC to be linked with a corresponding network security solution of the plurality of network security solutions, and a cloud server that connects the enterprise network and the threat analysis server.

11 Claims, 5 Drawing Sheets

(56) References Cited

U.S. PATENT DOCUMENTS

| | | | | |
|---|---|---|---|---|
| 11,005,860 | B1* | 5/2021 | Glyer | H04L 41/064 |
| 2010/0031353 | A1* | 2/2010 | Thomas | G06F 21/563 |
| | | | | 718/1 |
| 2012/0167161 | A1 | 6/2012 | Kim | |
| 2016/0080418 | A1* | 3/2016 | Ray | H04L 63/1416 |
| | | | | 726/1 |
| 2016/0080420 | A1* | 3/2016 | Ray | H04L 63/1408 |
| | | | | 726/1 |
| 2016/0173509 | A1* | 6/2016 | Ray | H04L 63/1425 |
| | | | | 726/23 |
| 2017/0193225 | A1* | 7/2017 | Moon | G06N 20/00 |
| 2018/0191747 | A1* | 7/2018 | Nachenberg | H04L 63/1416 |

FOREIGN PATENT DOCUMENTS

| | | | | |
|---|---|---|---|---|
| KR | 10-2017-0081386 A | | 7/2017 | |
| KR | 10-2018-0080450 A | | 7/2018 | |
| KR | 101880686 B1 | * | 7/2018 | G06F 21/58 |
| KR | 10-1968633 B1 | | 4/2019 | |

* cited by examiner

MANAGED DETECTION AND RESPONSE SYSTEM AND METHOD BASED ON ENDPOINTS

TECHNICAL FIELD

An embodiment according to the concept of the present invention relates to a managed detection and response (MDR) technology, and more particularly, to an MDR technology capable of automatically establishing a security policy for an enterprise network by generating an indicator of compromise (IOC) from malware detected from endpoints and linking the generated IOC with security devices of the enterprise network.

BACKGROUND ART

In general, Anti-Virus (AV) is a solution that protects enterprise or individual computers, servers, and networks, and refers to software that detects, treats, and defends malware, such as viruses, that exist in the computers, servers, and networks. A method most commonly used in such an antivirus solution includes a method of generating a signature containing the characteristics of malware to determine whether there is malware based on the signature and a method of analyzing how similar the behavior of a specific code is to that of a known malware to determine whether there is malware or not. The anti-virus based on the signature has a fatal disadvantage in that a first infected person has no choice but to occur and has a problem that is very vulnerable to unprecedented new threats such as zero day attack or ransomware and fileless malicious codes, and the behavior-based anti-virus has a fatal problem with a very high probability of false detection and a problem that a lot of system resources are also consumed. Because of these problems, recent anti-virus solutions tend to be evolved from signature-based or behavior-based solutions to endpoint detection and response (EDR) solutions. The EDR is a concept that has recently been attracting attention in the domestic and foreign security industry, and has an object to continuously monitor malicious codes and advanced persistent threats (APTs) that show advanced attack patterns in an endpoint area and provide practical responses. According to a Gartner Research report in 2018, the EDR is defined as a security solution that provides continuous monitoring and response at an endpoint level and needs to provide four functions of detect security incident, contain the incident at the endpoint, investigate security incident, and remediate endpoint to a preinfection state. However, like a conventional anti-virus solution, EDR, which is currently being discussed, also detects and blocks malware, and only repairs or restores damage in case of infection.

DISCLOSURE

Technical Problem

An object of the present invention is to provide managed detection and response system and method based on endpoints capable of automatically establishing a security policy for an enterprise network by generating an IOC from malware detected at an endpoint and linking the generated IOC with security devices of the enterprise network.

Technical Solution

According to an aspect of the present invention, a managed detection and response system based on endpoints includes an enterprise network including a plurality of endpoints in which an endpoint agent is installed or not installed to detect and block malware through a machine learning algorithm and a plurality of network security solutions for applying a predetermined security policy to the plurality of endpoints, a threat analysis server configured to generate an IOC by analyzing the detected and blocked malware in any one of the plurality of endpoints and establish the security policy according to the generated IOC to be linked with a corresponding network security solution of the plurality of network security solutions, and a cloud server that connects the enterprise network and the threat analysis server.

The threat analysis server may include a malware analysis module configured to perform static analysis and dynamic analysis for the detected and blocked malware in any one of the plurality of endpoints, an IOC module configured to establish the security policy by generating the IOC according to the result analyzed by the malware analysis module and link the established security policy with a corresponding network security solution among the plurality of network security solutions, and a reporting module configured to report the result analyzed by the malware analysis module to endpoints in which a management console is installed among the plurality of endpoints.

At this time, the malware analysis module may include a malware receiver configured to receive metadata about the malware detected and blocked from the endpoints and download the malware corresponding to the received metadata from a malware database of the cloud server, a static analyzer configured to perform the static analysis by performing at least one of metadata analysis, Application Programming Interface (API) analysis, and Portable Executable (PE) structural analysis by reverse-coding the downloaded malware, and a dynamic analyzer configured to perform the dynamic analysis by executing and analyzing the downloaded malware through a virtual machine or bare metal system.

Further, the malware analysis module may prevent false detection of the malware detected and blocked from the endpoint agent through the static analysis result and the dynamic analysis result.

According to an embodiment, the IOC module may include an IOC generation unit configured to generate the IOC by including at least one of a destination Internet Protocol (IP), a Uniform Resource Locator (URL), a port, a protocol, a HKEY_LOCAL_MACHINE (HKLM) registry change value, a user name, and a child process name as a field value according to the static and dynamic analysis results, and an IOC linkage unit configured to automatically establish the security policy to be applied to a corresponding network security solution among the plurality of network security solutions according to the IOC generated by the IOC generation unit to be linked with the corresponding network security solution.

At this time, the IOC generation unit may generate the IOC using at least one of the destination IP, the URL, the port, and the protocol as a field value when the malware is analyzed as malware that attempts to connection to the Command and Control (C2) server according to the static analysis and dynamic analysis results of the malware analysis module, generate the IOC using the HKLM registry change value as a field value when the malware is analyzed as malware of changing the HKLM registry value, and generate the IOC using the generated child process name as a field value when the malware is analyzed as malware of generating the child process.

Further, the IOC module may further include an IOC verification unit configured to confirm whether the destination IP or URL is associated with a specific security issue through external reputation comparison site inquiry when the destination IP or URL is included in the field value of the generated IOC.

In addition, the IOC linkage unit may establish and link the security policy to be applied to the firewall among the plurality of network security solutions when the destination IP or URL is included in the field value of the generated IOC, and establish and link the security policy to be applied to Network Access Control (NAC) among the plurality of network security solutions when the HKLM registry change value is included in the field value of the generated IOC.

According to another aspect of the present invention, a managed detection and response method based on endpoints includes steps of detecting and blocking malware from endpoints in which an endpoint agent is installed among a plurality of endpoints on an enterprise network, generating, by the endpoint agent, metadata for the detected and blocked malware to transmit the generated metadata to a malware analysis module of a threat analysis server, downloading, by the malware analysis module, malware corresponding to the transmitted metadata from a malware database of the cloud server, performing, by the malware analysis module, static analysis on the downloaded malware through at least one of meta information analysis, API analysis, and PE structure analysis, performing, by the malware analysis module, dynamic analysis by executing the downloaded malware through a virtual machine or bare metal system, generating, an IOC module of the threat analysis module, an IOC for the malware according to a static analysis result and a dynamic analysis result analyzed from the malware analysis module, and protecting, by the IOC module, endpoints in which the endpoint agent is not installed by establishing and linking a security policy to be applied to a network security solution of the enterprise network according to the generated IOC.

According to an embodiment, the generating of the IOC by the IOC module may include generating the IOC using at least one of the destination IP, the URL, the port, and the protocol as a field value when the malware is analyzed as malware that attempts to connection to the C2 server by the malware analysis module, generating the IOC using the HKLM registry change value as a field value when the malware is analyzed as malware of changing the HKLM registry value, and generating the IOC using the generated child process name as a field value when the malware is analyzed as malware of generating the child process.

According to an embodiment, the protecting of the endpoints in which the endpoint is not installed by the IOC module may include linking a policy of blocking access to the destination IP or URL as a security policy for firewall among the network security solutions when the destination IP, URL, port, and protocol are included in the field value of the generated IOC, and linking a policy of blocking a change of the specific registry as a security policy for NAC among the network security solutions when the registry change value is included in the field value of the generated IOC.

According to an embodiment, the managed detection and response method based on endpoints may further include directly receiving, by the malware analysis module, the detected and blocked malware from the endpoint agent when the malware corresponding to the received metadata does not exist in the malware database.

Advantageous Effects

According to the embodiment of the present invention, it is possible to automatically generate an IOC by analyzing malware detected from endpoints and automatically establish a security policy for an enterprise network by linking the generated IOC with security devices of the enterprise network.

That is, it is possible to establish a security policy for the entire network from the malware detected from endpoints.

BEST MODE FOR THE INVENTION

Hereinafter, preferred exemplary embodiments of the present invention will be described in detail with reference to the accompanying drawings.

Figure 1:
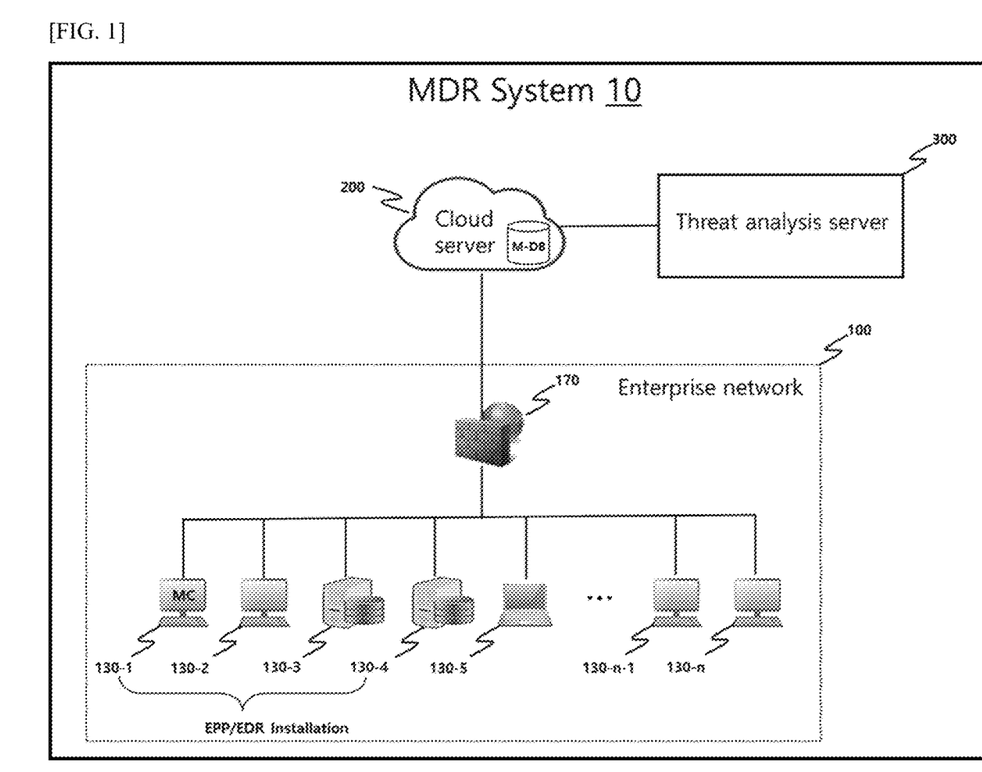
FIG. 1 is a block diagram illustrating a configuration of a managed detection and response system based on endpoints according to an embodiment of the present invention.

FIG. 1 is a block diagram illustrating a configuration of a managed detection and response system (hereinafter, referred to as an 'MDR system' 10) based on endpoints according to an embodiment of the present invention.

Referring to FIG. 1, the MDR system 10 includes an enterprise network 100, a cloud server 200, and a threat analysis server 300.

The enterprise network 100 includes endpoints 130-1 to 130-*n* such as PCs, laptops, and various servers, and a network security solution 170 such as a firewall, a network access control (NAC), and an intrusion detection system/intrusion prevention system (IDS/IPS).

An endpoint agent EPP/EDR may be installed in the endpoints 130-1 to 130-*n*, and may also be installed in all of the endpoints 130-1 to 130-*n* according to an embodiment, and the endpoint agent EPP/EDR may also be installed only in some endpoints (e.g., 130-1 to 130-4).

It is preferred that the endpoint agent EPP/EDR is installed on all of the endpoints 130-1 to 130-*n* of the enterprise network 100, but the endpoint agent EPP/EDR may be installed only in some endpoints (e.g., 130-1 to 130-4) according to a cost problem of enterprise operation. The MDR system 10 according to an embodiment of the present invention may protect the endpoints where the endpoint agent EPP/EDR is not installed by establishing the security policy of the network security solution 170.

Meanwhile, the endpoint agent EPP/EDR is installed in the endpoints (e.g., 130-1 to 130-4) to detect and block malware, and may transmit meta data Meta_Data for the detected malware to the threat analysis server 300 via the cloud server 200.

According to an embodiment, the endpoint agent EPP/EDR detects and blocks malware using a prediction-based and scoring-based machine learning algorithm to enable the protection of the endpoints (e.g., 130-1 to 130) regardless of known or unknown malware.

That is, the endpoint agent EPP/EDR may identify and block malicious executable files, identify a script execution location, control execution method and target, manage a USB device access and control unauthorized use of devices, and control an attacker not to use a fileless malware attack technique at an endpoint which has been protected through the predetermined machine learning algorithm.

In addition, the endpoint agent EPP/EDR can protect the endpoints (e.g., 130-1 to 130-4) from attacks based on scripts, memories such as fileless, and external devices and may prevent unknown threats without depending on a sandboxing foundation.

Therefore, since the endpoint agent EPP/EDR detects malware by performing scoring through a machine learning algorithm, signatures, heuristics, or sandboxes are not required to detect existing malware, and unnecessary system resources are not consumed.

In addition, even if other types of endpoint security solutions are already installed in the endpoints (e.g., 130-1 to 130-4), a conflict problem with the endpoint security solutions does not occur.

Meanwhile, the endpoint agent EPP/EDR generates metadata Meta_Data for the malware detected from the endpoints and transmits the generated metadata Meta_Data to the threat analysis server 300 via the cloud server 200.

In this case, the metadata Meta_Data may include information (e.g., IP, OS version, MAC address, etc.) on the endpoints where the malware is detected, a host name, an installation date of the endpoint agent EPP/EDR, a blocking file name (malware file name), a finding path (e.g., a found folder name), and a file representative hash value.

In addition, a management console MC may be additionally installed in any one (e.g., 130-1) of several endpoints (e.g., 130-1 to 130-4) where the endpoint agent EPP/EDR is installed, and an enterprise security manager may confirm a malware blocking status at each endpoint or a malware analysis response report (information on malware or security recommendations, etc.) from the threat analysis server 300 to be described below via the management console MC.

The network security solution 170 includes external security solutions that control traffic access from an external network (e.g., Internet) such as Firewall and IDS/IPS, and internal security solutions that control access of endpoints to an external network such as NAC, and may control whether to allow traffic or access transmitted between the two networks according to a predetermined security policy.

Meanwhile, the cloud server 200 may be implemented as a known public cloud server, and of course, may also be implemented as a physical server according to an embodiment.

In the related art, various files were stored on a PC or on a physical server within an enterprise, but now, enterprises and individuals may store data on a central computer connected to the Internet as a cloud service to and use the stored data anytime and anywhere.

According to an embodiment, the cloud server 200 may provide various security services such as a network firewall and a web application firewall (WAF) service for the purpose of protecting personal information and customer data and controlling a network access.

Figure 2:
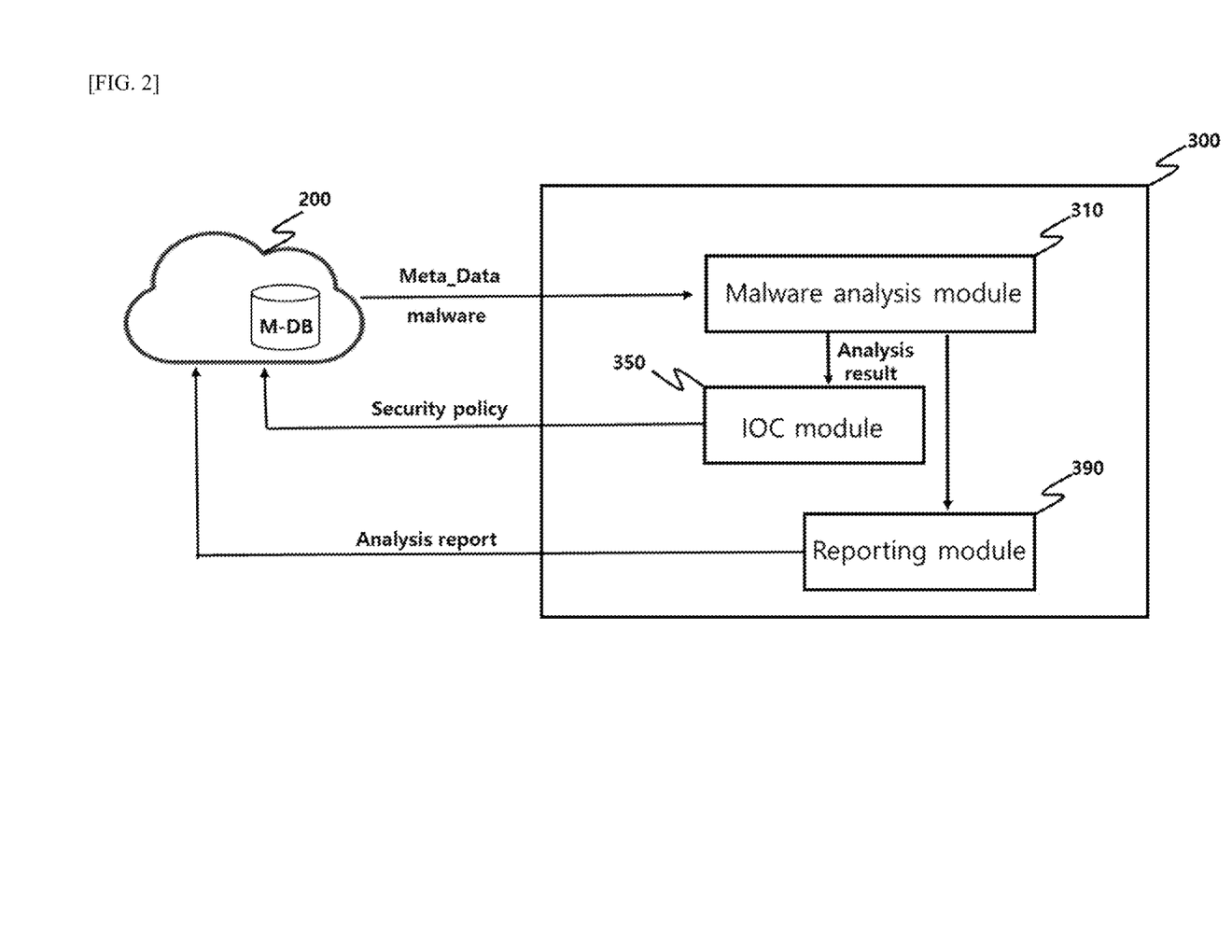
FIG. 2 is a block diagram illustrating an internal configuration of a threat analysis server illustrated in FIG. 1.
Figure 3:
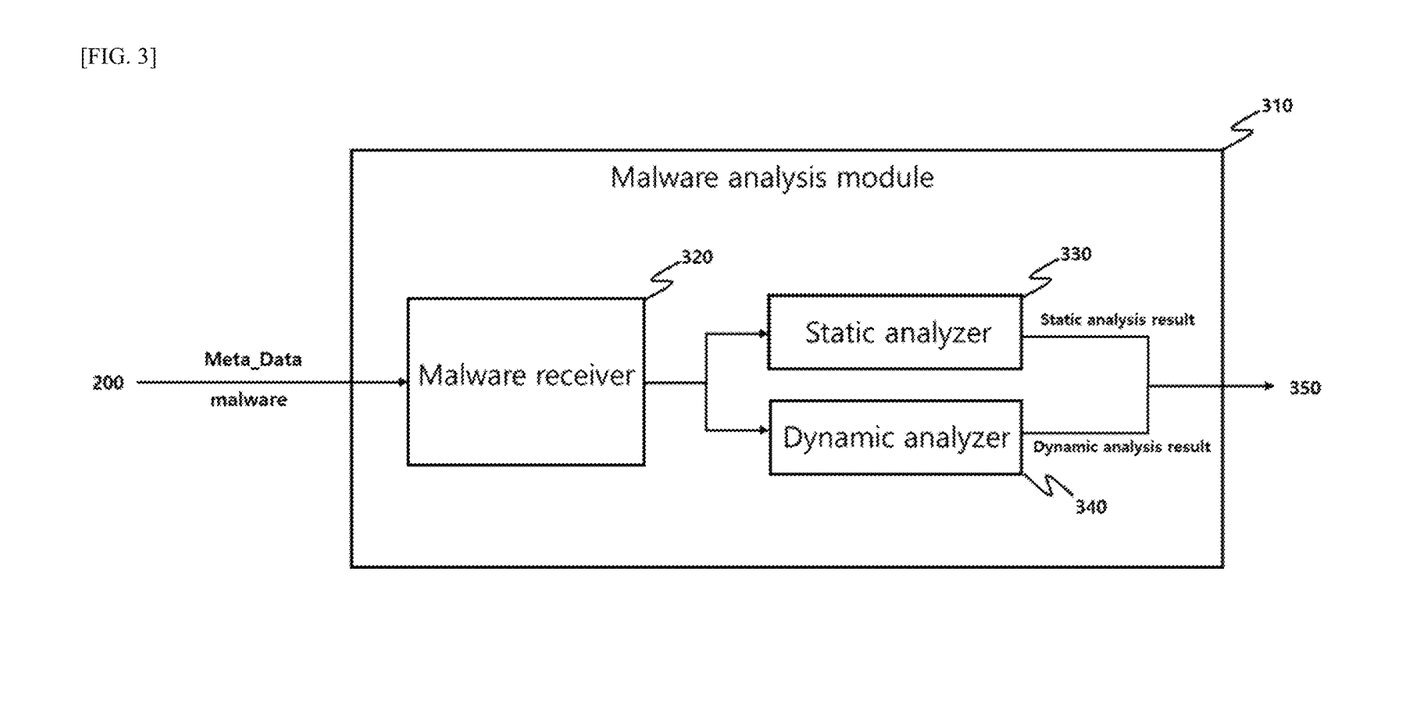
FIG. 3 is a block diagram illustrating an internal configuration of a malware analysis module according to an embodiment of the present invention.
Figure 4:
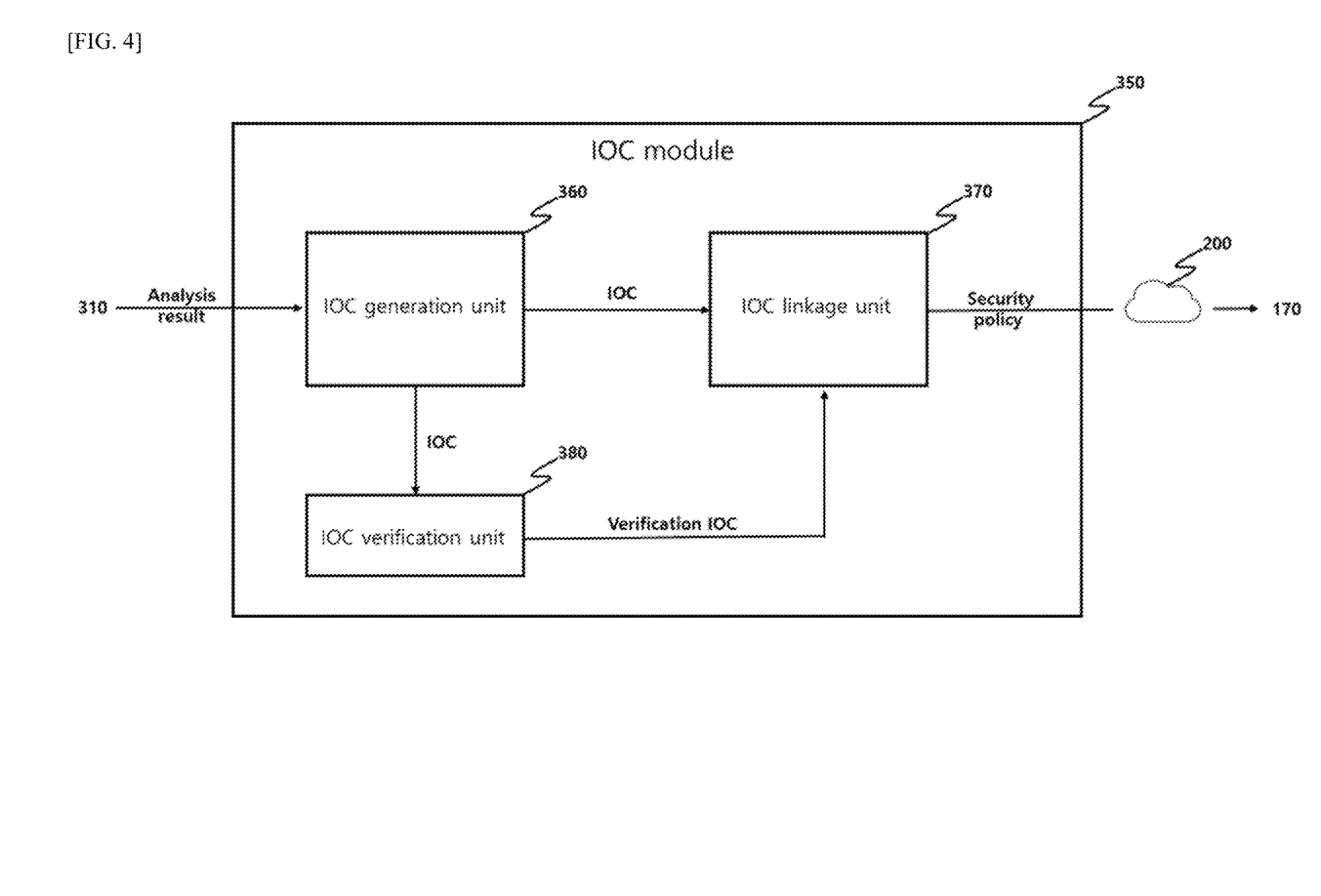
FIG. 4 is a block diagram illustrating an internal configuration of an IOC module according to an embodiment of the present invention.

FIG. 2 is a block diagram illustrating an internal configuration of the threat analysis server 300 illustrated in FIG. 1, FIG. 3 is a block diagram illustrating an internal configuration of the malware analysis module 310 according to an embodiment of the present invention, and FIG. 4 is a block diagram illustrating an internal configuration of the IOC module 350 according to an embodiment of the present invention.

Referring to FIGS. 1 to 4, the threat analysis server 300 may provide a service that replaces a security operation center (SOC) of the enterprise, and include a malware analysis module 310, an IOC module 350, and a reporting module 390.

The malware analysis module 310 of the threat analysis server 300 serves to receive metadata about the malware transmitted through the cloud server 200 from the endpoint agent EPP/EDR, download the malware corresponding to the received metadata from a malware database (M-DB) of the cloud server 200, and analyze the corresponding downloaded malware.

In this case, the malware analysis module 310 includes a malware receiver 320 that downloads malware corresponding to the received metadata, and a static analyzer 330 and a dynamic analyzer 340 that analyze the downloaded malware.

First, the malware receiver 320 receives metadata about the malware detected from the endpoint agent EPP/EDR, and stores the malware corresponding to the received metadata in the malware database M-DB of the cloud server 200.

According to an embodiment, when the malware corresponding to the received metadata does not exist in the malware database (M-DB) of the cloud server 200, the malware receiver 320 may directly receive the detected malware from the endpoint.

Next, the static analyzer 330 analyzes the downloaded malware by reverse-coding through reverse engineering, and the dynamic analyzer 340 analyzes the behavior of the corresponding malware by executing the corresponding malware through a bare metal such as a virtual machine VM or a mini barebones PC (Next Unit of Computing, NUC).

In the related art, static analysis or dynamic analysis was performed to determine whether there was malware itself, and at this time, the static analysis has a low time cost, but has a limitation in being inflexible for variant malicious code, and the dynamic analysis is flexible for variant malicious codes, but has a limitation of high time cost.

However, the static analyzer 330 and the dynamic analyzer 340 of the present invention do not determine the presence or absence of malware through static analysis and dynamic analysis, but perform the analysis to generate an IOC for malware already determined from the endpoint agent EPP/EDR of the endpoint, so that the limitations of the related art are not a large problem.

In more detail, the static analyzer 330 may perform static analysis on the malware as an analysis target, that is, the downloaded malware through at least one of meta information analysis, API analysis, and PE structure analysis.

In general, software displays a name, version information, product name, etc. of a program as meta information in a production process, and the static analyzer 330 may utilize the meta information as basic information for identifying the purpose and use of the software.

In addition, the static analyzer 330 may analyze a binary file itself of the malware or hook and analyze API information called in the program operation process, with respect to an application programming interface (API) that uses system resources or calls resources inside the program for interaction with other application programs.

Furthermore, the static analyzer 330 may analyze a portable executable (PE) file structure, obtain attribute information of the file by analyzing the PE header, and also analyze executable file packing or a compiler of the executable file.

As a result, the static analyzer 330 may analyze the structure and operation of the malware without executing the corresponding malware.

Meanwhile, the dynamic analyzer 340 may analyze a state change of the process and the system by executing the malware in a controllable environment such as a virtual machine (VM) or a mini barebones PC (NUC) and observe an exact actual behavior regardless of run-time packer and code obfuscation.

The dynamic analyzer 340 executes the downloaded malware, and analyzes a behavior such as whether the executed malware changes a registry, induces access to a specific command & control (C&C) server, or generates a child process.

For example, the dynamic analyzer 340 may analyze a characteristic of the malware by analyzing a registry frequency, a calling process, and a calling result called in the process of executing the corresponding malware.

The registry is a concept of a database that stores all setting information of the Windows operating system, and includes configuration values and settings in which the operating system operates, operating system software information, hardware information, and information on user's PC preference and the like.

The malware performs registry access such as automatic execution registration, Windows firewall registration/deletion, remote access terminal activation, service registration, etc. to achieve a malicious purpose, and the dynamic analyzer 340 may analyze these changes in the registry to determine characteristics of the corresponding malware.

In addition, the dynamic analyzer 340 may analyze information on a C2 server that induces access in the process of executing the corresponding malware to determine the characteristics of the corresponding malware.

The C2 server is an infrastructure that a malware attacker can command or control for an endpoint infected with the malware, and may perform various functions such as file deletion, download, upload, command execution, and log transmission.

Accordingly, the dynamic analyzer 340 may analyze an IP, a URL, a port, a protocol, etc. of the C2 server to determine the characteristics of the corresponding malware that induces access to the C2 server.

Furthermore, the dynamic analyzer 340 may also analyze the characteristics of the malware by analyzing a child process that is additionally generated in the process of executing the corresponding malware.

According to an embodiment, the dynamic analyzer 340 may confirm whether an ANTI VM technique is applied to the malware when performing the analysis through the virtual machine VM, and delete the corresponding command when the ANTI VM technique exists or execute and analyze the malware after bypassing the command through API hooking.

As a result, the malware analysis module 310 of the present invention derives a static analysis result and a dynamic analysis result for the corresponding malware, so that the IOC module 350 may generate an IOC for the corresponding malware below.

Furthermore, the malware analysis module 310 of the present invention performs static and dynamic analysis on the malware that has already been determined as malware from the machine learning scoring-based endpoint agent EPP/EDR to have an effect of minimizing a malware false detection problem of the scoring-based endpoint agent EPP/EDR using the machine learning algorithm.

According to an embodiment, the malware receiver 320 of the threat analysis server 300 may also receive an analysis request for a specific file from an endpoint in which the endpoint agent EPP/EDR is not installed.

In this case, the malware receiver 320 directly receives the specific file from the endpoint in which the endpoint agent EPP/EDR is not installed in response to the analysis request, and the malware analysis module 310 may perform the static analysis and dynamic analysis for the received specific file.

Referring back to FIG. 4, the IOC module 350 includes an IOC generation unit 360 that generates an IOC for the corresponding malware according to the result analyzed by the malware analysis module 310, and an IOC linkage unit 370 that automatically establishes a security policy from the generated IOC.

The IOC generation unit 360 generates an indicator of compromise (IOC) for the corresponding malware according to the static analysis result and the dynamic analysis result analyzed by the malware analysis module 310.

According to an embodiment, the IOC generation unit 360 may generate the IOC by including at least one of a destination IP, a URL, a port, a protocol, a HKLM registry change value, a user name, and a generated child process name according to the static and dynamic analysis results as a field value.

That is, the IOC generation unit 360 may generate the IOC using the destination IP, the URL, the port, and the protocol as a field value when the corresponding malware is analyzed as malware that attempts to connection to the C2 server, generate the IOC using the HKLM registry change value as a field value when the corresponding malware is analyzed as malware of changing the registry, and generate the IOC using the generated child process name as a field value when the corresponding malware is analyzed as malware of generating the child process.

Similarly, if the corresponding malware is analyzed as malware that performs C2 server connection, registry change, and child process at once, an IOC including all of the elements may be generated.

According to an embodiment, the IOC module 350 may further include an IOC verification unit 380 for verifying the validity of the IOC generated by the IOC generation unit 360.

For example, when the IOC generated by the IOC generation unit 360 includes the destination IP or URL (that is, when the corresponding malware is connected to the C2 server), the IOC verification unit 380 may confirm and verify whether the IP or URL is associated with a specific security issue through external reputation comparison site inquiry.

On the other hand, the IOC linkage unit 370 automatically establishes a security policy to be applied to the network security solution 170 of the enterprise network 100 according to the IOC generated by the IOC generation unit 360 to be linked with the network security solution 170.

For example, when the destination IP, the URL, the port, and the protocol are included in the field value of the IOC generated by the IOC generation unit 360, the IOC linkage unit 370 may establish and link a security policy to be applied to the firewall among the network security solutions 170, and the security policy to be applied to the firewall may be a policy that blocks access to the destination IP and URL.

In addition, when the registry change value is included in the field value of the IOC generated by the IOC generation unit 360, the IOC linkage unit 370 may establish and link a security policy to be applied to the NAC among the network security solutions 170, and the security policy to be applied to the NAC may be a policy that blocks the specific registry from being changed.

As a result, since the IOC linkage unit 370 may link the generated IOC to the network security solution 170 as a security policy, it is possible to protect endpoints in which the endpoint agent EPP/EDR is not installed.

Meanwhile, the reporting module 390 may report the static analysis and dynamic analysis results analyzed from the malware analysis module 310 weekly, monthly, and quarterly, and transmit the reported results to the management console MC.

Figure 5:
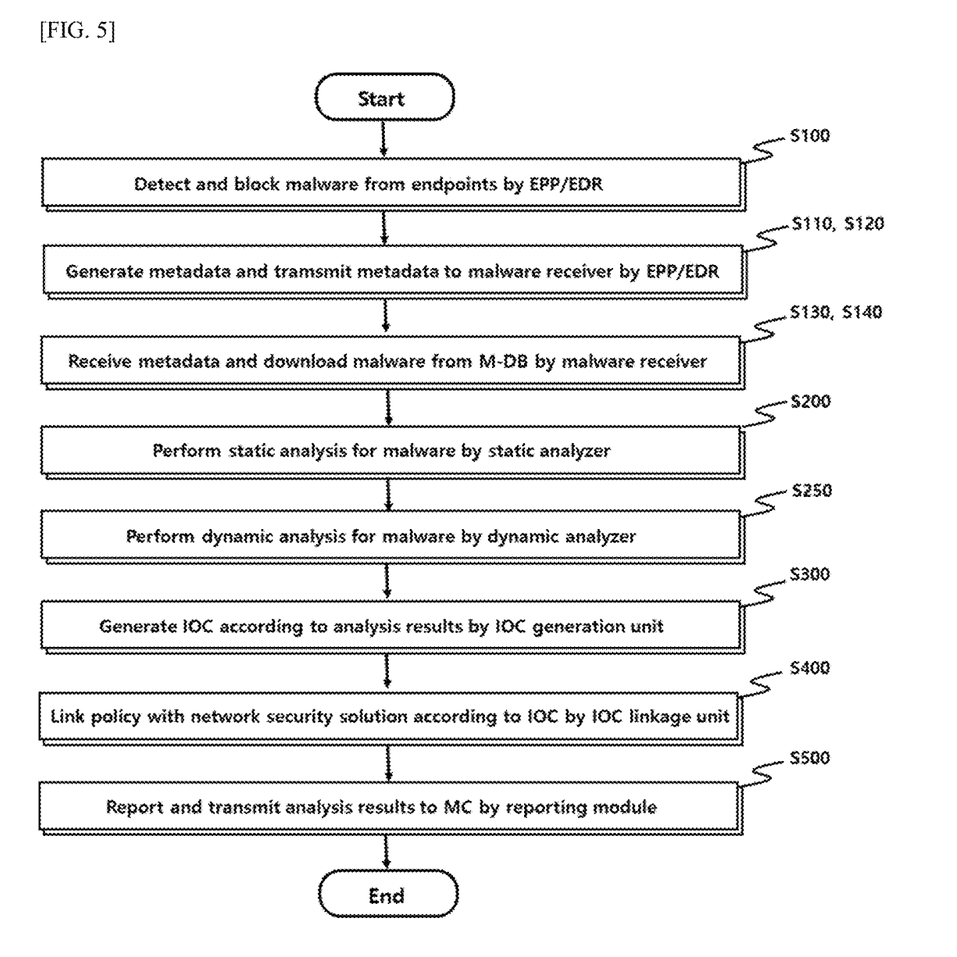
FIG. 5 is a flowchart for describing a managed detection and response method based on endpoints according to an embodiment of the present invention.

FIG. 5 is a flowchart for describing a managed detection and response method based on endpoints according to an embodiment of the present invention.

Referring to FIGS. 1 to 5, an endpoint agent EPP/EDR is installed in endpoints (e.g., 130-1 to 130-4) to detect and block malware (S100).

The endpoint agent EPP/EDR detects and blocks the malware using a prediction-based and scoring-based machine learning algorithm (S100) to enable the protection of the endpoints (e.g., 130-1 to 130-4) regardless of known or unknown malware.

Thereafter, the endpoint agent EPP/EDR generates metadata Meta_Data for the malware detected from the endpoints (S110), and transmits the generated metadata Meta_Data to the malware analysis module 310 of the threat analysis server 300 via the cloud server 200 (S120).

In this case, the metadata Meta_Data may include information on the endpoint where the malware is detected, a host name, an installation date of the endpoint agent EPP/EDR, a blocked file name and finding path, and a file representative hash value.

The malware receiver 320 of the malware analysis module 310 receives metadata about the malware detected from the endpoint agent EPP/EDR (S130), and downloads the malware corresponding to the received metadata from the malware database M-DB of the cloud server 200 (S140).

According to an embodiment, when the malware corresponding to the received metadata does not exist in the malware database (M-DB) of the cloud server 200, the malware receiver 320 may directly receive the detected malware from the endpoints (S140-1).

According to another embodiment, the malware receiver 320 receives an analysis request for a specific file from endpoints in which the endpoint agent EPP/EDR is not installed (S130-2), and may also directly receive the specific file from the endpoints in which the endpoint agent EPP/EDR is not installed in response to the analysis request (S140-2).

The static analyzer 330 performs static analysis on the downloaded malware through at least one of meta information analysis, API analysis, and PE structure analysis (S200).

The dynamic analyzer 340 performs dynamic analysis through execution of the downloaded malware in a controllable environment such as a virtual machine (VM) or a mini barebones PC (NUC) (S250).

At this time, the dynamic analyzer 340 may analyze a behavior such as whether the executed malware changes a registry, induces access to a specific C2 (Command & Control, C&C) server, or generates a child process (S250).

According to an embodiment, the dynamic analyzer 340 may confirm whether an ANTI VM technique is applied to the malware when performing the analysis through the virtual machine VM, and delete the corresponding command when the ANTI VM technique exists or also execute and analyze the malware after bypassing the command through API hooking (S250-1).

The IOC generation unit 360 of the IOC module 350 generates an indicator of compromise (IOC) for the corresponding malware according to the static analysis result and the dynamic analysis result analyzed by the malware analysis module 310 (S300).

At this time, the IOC generation unit 360 may generate the IOC by including at least one of a destination IP, a URL, a port, a protocol, a HKLM registry change value, a user name, and a generated child process name according to the static and dynamic analysis results as a field value (S300).

That is, the IOC generation unit 360 may generate an IOC including the destination IP, the URL, the port, and the protocol when the corresponding malware is analyzed as malware that attempts to connection to the C2 server, generate an IOC including the HKLM registry change value when the corresponding malware is analyzed as malware of changing the registry, and generate an IOC including the generated child process name when the corresponding malware is analyzed as malware of generating the child process.

When the IOC generated by the IOC generation unit 360 includes a destination IP or URL, the IOC verification unit 380 may confirm and verify whether the IP or URL is associated with a specific security issue through external reputation comparison site inquiry (S320).

The IOC linkage unit 370 automatically establishes a security policy to be applied to the network security solution 170 of the enterprise network 100 according to the IOC generated by the IOC generation unit 360 to be linked with the network security solution 170 (S400).

For example, when the field value of the generated IOC includes the destination IP, URL, port, and protocol, the IOC linkage unit 370 links a policy for blocking access to the destination IP and URL with a firewall policy of the network security solution 170 (S400).

In addition, if the registry change value is included in the field value of the generated IOC, the IOC linkage unit 370 links the policy for blocking the change of the specific registry with the NAC policy of the network security solution 170 (S400).

As a result, since the IOC linkage unit 370 may link the generated IOC to the network security solution 170 as a security policy, it is possible to protect endpoints in which the endpoint agent EPP/EDR is not installed.

The reporting module 390 may report the static analysis and dynamic analysis results analyzed from the static analyzer 330 and the dynamic analyzer 340 weekly, monthly, and quarterly, and transmit the reported results to the management console MC (S500).

As such, the MDR system 10 and the MDR method according to an embodiment of the present invention can automatically generate an IOC for the blocked malware through the endpoint agent EPP/EDR, and automatically link the generated IOC with the security policy of the solution 170.

The above description just illustrates the technical spirit of the present invention and various changes and modifications can be made by those skilled in the art to which the present invention pertains without departing from an essential characteristic of the present invention.

Therefore, the exemplary embodiments of the present invention are provided for illustrative purposes only but not intended to limit the technical concept of the present invention. The scope of the technical concept of the present invention is not limited thereto. The protective scope of the present disclosure should be construed based on the appended claims, and all the technical spirits in the equivalent scope thereof should be construed as falling within the scope of the present disclosure.

INDUSTRIAL APPLICABILITY

The present invention relates to managed detection and response system and method based on endpoints capable of automatically generating an IOC by analyzing malware detected from the endpoints and automatically establishing a security policy of an enterprise network by linking the generated IOC with security devices of the enterprise network, and has industrial applicability.

The invention claimed is:

1. A managed detection and response system based on endpoints comprising:
an enterprise network including a plurality of endpoints in at least one of which an endpoint agent is installed to detect and block malware through a machine learning algorithm and a plurality of network security solutions for applying a predetermined security policy to the plurality of endpoints;
a threat analysis server configured to generate an Indicator of Compromise (IOC) by analyzing the detected and blocked malware and establish the security policy according to the generated IOC to be linked with a corresponding network security solution of the plurality of network security solutions; and
a cloud server that connects the enterprise network and the threat analysis server,
wherein the threat analysis server is configured to:
perform a static analysis and a dynamic analysis for the detected and blocked malware;
establish the security policy by generating the IOC according to results of the static analysis and the dynamic analysis and link the established security policy with the corresponding network security solution according to the generated IOC; and
report the results of the static analysis and the dynamic analysis to endpoints in which a management console is installed among the plurality of endpoints,
wherein the dynamic analysis result includes a destination Internet Protocol (IP), a Uniform Resource Locator (URL), a port, and a protocol of a Command and Control (C2) server which is accessed when the malware is executed,
wherein the IOC includes the destination IP, the URL, the port, and the protocol of the C2 server which is accessed when the malware is executed,
wherein the linked security policy blocks an access to the destination IP and the URL of the C2 server.

2. The managed detection and response system based on endpoints of claim 1, wherein the threat analysis server is further configured to:
receive metadata about the detected and blocked malware and download the malware corresponding to the received metadata from a malware database of the cloud server;
perform the static analysis by performing at least one of metadata analysis, Application Programming Interface (API) analysis, and Portable Executable (PE) structural analysis by reverse-coding the downloaded malware; and
perform the dynamic analysis by executing and analyzing the downloaded malware through a virtual machine or bare metal system.

3. The managed detection and response system based on endpoints of claim 1, wherein the threat analysis server is further configured to prevent false detection of the detected and blocked malware through the static analysis result and the dynamic analysis result.

4. The managed detection and response system based on endpoints of claim 1, wherein the threat analysis server is further configured to:
generate the IOC by including at least one of a HKEY_LOCAL_MACHINE (HKLM) registry change value, a user name, and a child process name as a field value according to the static and dynamic analysis results; and
automatically establish the security policy to be applied to a corresponding network security solution among the plurality of network security solutions according to the IOC generated by the threat analysis server to be linked with the corresponding network security solution.

5. The managed detection and response system based on endpoints of claim 4, wherein the threat analysis server is further configured to:
generate the IOC using the HKLM registry change value as a field value when the malware is analyzed as malware of changing a HKLM registry, and
generate the IOC using the generated child process name as a field value when the malware is analyzed as malware of generating a child process.

6. The managed detection and response system based on endpoints of claim 4, wherein the threat analysis server is further configured to confirm whether the destination IP or URL is associated with a specific security issue through external reputation comparison site inquiry when the destination IP or URL is included in the field value of the generated IOC.

7. The managed detection and response system based on endpoints of claim 4, wherein the threat analysis server is further configured to establish and link the security policy to be applied to the firewall among the plurality of network security solutions when the destination IP or URL is included in the field value of the generated IOC, and
wherein the threat analysis server is further configured to establish and link the security policy to be applied to Network Access Control (NAC) among the plurality of network security solutions when the HKLM registry change value is included in the field value of the generated IOC.

8. A managed detection and response method based on endpoints comprising steps of:
detecting and blocking, by an endpoint agent, malware from endpoints in which the endpoint agent is installed among a plurality of endpoints on an enterprise network;
generating, by the endpoint agent, metadata for the detected and blocked malware to transmit the generated metadata to a threat analysis server;
downloading, by the threat analysis server, malware corresponding to the transmitted metadata from a malware database of a cloud server;
performing, by the threat analysis server, a static analysis on the downloaded malware through at least one of meta information analysis, Application Program Interface (API) analysis, and Portable Executable (PE) structure analysis;
performing, by the threat analysis server, a dynamic analysis by executing the downloaded malware through a virtual machine or bare metal system;

generating, by the threat analysis server, an Indicator of Compromise (IOC) for the malware according to a static analysis result and a dynamic analysis result analyzed from the threat analysis server; and protecting, by the threat analysis server, endpoints in which the endpoint agent is not installed by establishing and linking a security policy to be applied to a network security solution of the enterprise network according to the generated IOC, wherein the dynamic analysis result includes a destination Internet Protocol (IP), a Uniform Resource Locator (URL), a port, and a protocol of a Command and Control (C2) server which is accessed when the downloaded malware is executed, wherein the IOC includes the destination IP, the URL, the port, and the protocol of the C2 server which is accessed when the downloaded malware is executed, wherein the linked security policy blocks an access to the destination IP and the URL of the C2 server.

9. The managed detection and response method based on endpoints of claim 8, wherein the generating of the IOC comprises;

generating the IOC using a HKEY_LOCAL_MACHINE (HKLM) registry change value as a field value when the malware is analyzed as malware of changing a HKLM registry, and generating the IOC using a child process name as a field value when the malware is analyzed as malware of generating a child process.

10. The managed detection and response method based on endpoints of claim 8, wherein the protecting of the endpoints in which the endpoint is not installed comprises:

linking a policy of blocking access to the destination IP or URL as a security policy for firewall among the network security solutions when the destination IP, URL, port, and protocol are included in the field value of the generated IOC; and linking a policy of blocking a change of the specific registry as a security policy for Network Access Control (NAC) among the network security solutions when the registry change value is included in the field value of the generated IOC.

11. The managed detection and response method based on endpoints of claim 8, further comprising:

directly receiving, by the threat analysis server, the detected and blocked malware from the endpoint agent when the malware corresponding to the received metadata does not exist in the malware database.

* * * * *